(12) United States Patent
Yang (10) Patent No.: US 12,107,405 B2
(45) Date of Patent: Oct. 1, 2024

(54) OUTLET BOX

(71) Applicant: IPEX TECHNOLOGIES INC., Oakville (CA)

(72) Inventor: Tianyuan Yang, Milton (CA)

(73) Assignee: IPEX TECHNOLOGIES INC., Mississauga (CA)

(*) Notice: Subject to any disclaimer, the term of this patent is extended or adjusted under 35 U.S.C. 154(b) by 105 days.

(21) Appl. No.: 17/868,023

(22) Filed: Jul. 19, 2022

(65) Prior Publication Data

US 2023/0178970 A1   Jun. 8, 2023

(30) Foreign Application Priority Data

Dec. 2, 2021 (CA) .............................. CA 3140973

(51) Int. Cl.
*H02G 3/08* (2006.01)
*H02G 3/14* (2006.01)

(52) U.S. Cl.
CPC ..................................... *H02G 3/14* (2013.01)

(58) Field of Classification Search
CPC ............. H02G 3/14; H02G 3/10; H02G 3/081
See application file for complete search history.

(56) References Cited

U.S. PATENT DOCUMENTS

| | | | |
|---|---|---|---|
| 5,317,108 A * | 5/1994 | Prairie, Jr. | ............... H02G 3/14 174/67 |
| 5,789,453 A | 7/1998 | Noveon | |
| 5,912,277 A | 6/1999 | Detterman | |
| 7,598,453 B1 * | 10/2009 | Shotey | ..................... H02G 3/14 174/67 |
| 10,230,227 B1 | 3/2019 | Wade et al. | |
| 2008/0011503 A1 * | 1/2008 | Dinh | ........................ H02G 3/14 174/53 |
| 2010/0077681 A1 * | 4/2010 | McCleskey | ............ H02G 3/185 220/592.01 |

(Continued)

FOREIGN PATENT DOCUMENTS

| | | |
|---|---|---|
| CN | 20111428 | 1/2012 |
| DE | 4443519 | 10/1995 |

(Continued)

*Primary Examiner* — Stephen J Castellano
(74) *Attorney, Agent, or Firm* — Jeffrey Pervanas; Riches, Mckenzie & Herbert LLP (57) ABSTRACT

An outlet box comprises a box body and a lid. The box body defines an internal space and has a lid opening permitting access to the internal space. The lid is releasably attachable to the lid opening of the body in a closed configuration, which prevents access to the internal space, and releasably attachable to an external retaining tab of the body in an open configuration, which permits access to the internal space through the lid opening. An attaching mechanism may optionally be used to releasable attach the lid to the external retaining tab, in the open configuration, and to prevent manual relative rotation of the lid with respect to the lid opening in the closed configuration. A gasket may be co-molded with the lid. The external retaining tab may extend from the base wall and has elongated mounting slots for receiving a mounting mechanism. The elongated mounting slots permit relative movement of the box body with respect to the mounting mechanism when in a semi-tightened position.

17 Claims, 8 Drawing Sheets

(56) References Cited

U.S. PATENT DOCUMENTS

2013/0306343 A1 11/2013 Magno, Jr. et al.
2015/0270734 A1* 9/2015 Davison ............... H04B 1/3888
　　　　　　　　　　　　　　　　　　　　　　320/103

FOREIGN PATENT DOCUMENTS

EP　　　　0911273　　　4/1999
GB　　　　2375439　　　10/2004

* cited by examiner

OUTLET BOX

FIELD OF THE INVENTION

This invention relates to outlet boxes having a box body defining an internal space and an opening permitting access to the internal space. More particularly, the invention relates to outlet boxes, preferably non-metallic, which may have one or more apertures to receive cable glands or electrical conduits into the internal space and may have a lid releasably attachable to the lid opening.

BACKGROUND OF THE INVENTION

In the past, various types of outlet boxes have been used in electrical applications and communication applications. Such electrical and communication applications may include, for example, using outlet boxes along conduits to simplify wiring installations and/or change wiring directions, such as in commercial industrial applications. In some applications, outlet boxes may be used to hang luminaires.

In general, some outlet boxes have a body and a lid such that removal of the lid permits access to an internal space of the outlet box for installation of electrical components or inspection: sere icing of any internal components that may have been installed within the outlet box.

Typically, outlet boxes may be installed to structures during construction. Alternatively, the outlet boxes may be retrofitted to existing buildings.

Typically, outlet boxes may have a lid opening to which a lid may be releasably attachable. The lid may be required to seal the lid opening of the outlet box after the installation process, and could protect the internal component from water and/or weather. However, during the installation process, it is cumbersome to have the lid attached to the lid opening of the outlet box as it prevents easy access to the internal space and/or internal components. This is also the case during inspection, both during installation and/or construction as well as inspection such as by regulatory inspectors. Because of this, it is often common for the lid to be removed during construction, installation and/or inspection. However, this may result in potential loss, damage or misplacement of the lid with respect to the outlet box body which can delay the construction, and/or installation process. Loss of a lid, as well as any associated attaching mechanism, could also delay any necessary regulatory inspection and approval of the associated construction and/or installation.

Furthermore, in some cases where the lid is releasably attached to the lid opening of the outlet box by relative manual rotation, it is preferable to also have a tamper-resistant mechanism. The tamper-resistant mechanism generally involves an attaching mechanism that requires a tool for manipulation and/or cannot be otherwise manipulated by hand. Thus, such tamper-resistant mechanisms may provide potential additional difficulties in that, if the components associated with the tamper-resistant mechanism, such as the attaching mechanism that cannot be manipulated by hand, is lost or damaged during construction and/or installation, this could render the outlet box unusable until a replacement tamper-resistant mechanism is found. This may also delay installation as well as any necessary regulatory inspection and approval of the outlet box, and the associated construction and/or installation.

In other cases, during installation and construction, the position of outlet boxes may need to be adjusted for a number of reasons, including alignment of the apertures of the outlet box with cables or conduits to enter the junction box body. However, adjusting the physical position of outlet boxes may be difficult if holes have been previously drilled into an underlying support surface and/or screws or bolts have mounted the outlet box to an underlying support surface.

Accordingly, there is a need in the art for a new outlet box which addresses at least some of the disadvantages of the prior art.

SUMMARY OF THE INVENTION

Accordingly, it is an object of this invention to at least partially overcome some of the disadvantages of the prior art. Also, it is an object of at least some embodiments of this invention to provide an improved type of outlet box to which a lid may be releasably attachable in an open configuration, permitting access to the interior of the outlet box housing cables and other components, and in a closed configuration, preventing access to the interior of the outlet box. Also, it is an object of at least some embodiments of this invention to permit adjustment of the physical position of the outlet box after holes have been previously drilled to mount the junction box to an underlying support surface.

Accordingly, in at least one of its aspects, this invention resides in an outlet box comprising: a box body having walls defining an internal space with a lid opening, said lid opening permitting access to the internal space; a lid releasably attachable to the lid opening in a closed configuration which prevents access to the internal space of the box body through the lid opening: an external retaining tab located externally from the internal space; and wherein the lid is releasably attachable to the external retaining tab in an open configuration which permits access to the internal space through the lid opening.

In at least one aspect of a preferred non-limiting embodiment, the present invention provides an outlet box body for use as an outlet box, said outlet box body having walls defining an internal space and an opening, said opening permitting access to the internal space, said walls of the outlet box body comprising a base wall opposed from the opening and a peripheral side wall separating the base wall from the opposed opening to define the internal space therein; an external retaining tab located externally from the internal space; wherein the external retaining tab comprises an elongated mounting slot extending lengthwise substantially parallel to the peripheral side wall for receiving a mounting mechanism at different positions along its length to mount the outlet box body; and wherein the mounting mechanism has a first semi-tightened position in the elongated mounting slot, where the outlet box body is movably mounted to a support surface such that relative movement of the outlet box body with respect to the mounting mechanism in the elongated mounting slot is permitted, and a second tightened position in the elongated mounting slot, where the outlet box is immovably mounted to the support surface such that relative movement of the outlet box body with respect to the mounting mechanism in the elongated mounting slot is restricted.

Accordingly, an advantage of at least some embodiments of the present invention relates to the lid being optionally releasably attachable to the outlet box body in two different configurations, namely an open configuration and a closed configuration. In the open configuration, the lid is attachable to an external portion of the outlet box permitting access to the internal space of the outlet box for installation of cables and other components for which the outlet box may be used.

Further, in the open configuration, inspection of the internal space, including any cables or installed components, may be easily performed. However, in this open configuration, the lid may be nevertheless releasably attached to the outlet box limiting the possibility of damage or loss of the lid. In the closed configuration, the lid is releasably attached to the lid opening in a manner which prevents access to the internal space. Thus, the closed configuration may be the common configuration after the installation process has been completed with the lid substantially covering the lid opening of the outlet body as well as any cables or components in the internal space. In the closed configuration, the lid may also provide protection to the internal space, and any cables or components installed therein, such as from the weather and/or water in outdoor environments.

Accordingly, an advantage of at least some embodiments of the present invention relates to the lid being releasably attached to the external retaining tab in the open configuration after the outlet box has been mounted on to a support surface and while the construction or installation is ongoing. This prevents the potential loss of the lid and/or attaching mechanism during construction as discussed above. This also permits easy access to the internal space of the electrical enclosure for installation. Furthermore, having the lid releasably attachable to an external retaining tab in an open configuration permits more convenient inspection by third party inspectors, such as building inspectors and electrical inspectors, by avoiding the need for them to remove the lid for inspection purposes, which could also result in loss or damage to the lid and/or attaching mechanism.

A further advantage of additional embodiments of the present invention relates to an attaching mechanism, such as a screw or bolt, optionally being used to releasably attach the lid to the external retaining tab in the open configuration, and the same attaching mechanism optionally being used in the closed configuration to prevent manual rotation of the lid with respect to the box body in a tamper-resistant manner. In this way, the total number of components of the outlet box may be decreased, thus potentially decreasing the cost of manufacture of the outlet box and improving its ease of use. Furthermore, using the same attaching mechanism that cannot be manipulated by hand to releasably attach the lid to the external retaining tab in the open configuration as well as to the body in the tamper-resistant manner, lessens the likelihood that the attaching mechanism would be lost or damaged during installation or construction. This may avoid potentially costly delays during installation, and/or regulatory inspection, while a replacement tamper-resistant attaching mechanism is obtained.

A further advantage of additional embodiments of the present invention relate to the outlet box having two opposed external retaining tabs, on opposite sides of the outlet box body. In this way, alternate external retaining tabs may be available to releasably attach the lid in the open configuration. This increases the versatility of the outlet box be permitting the lid to be releasably attached at different locations on the outlet body. This also increases the robustness of the outlet box, such as if the lid in the open configuration is hit or forcibly removed, thereby potentially damaging one of the retaining openings. In further preferred embodiments, three or more external retaining tabs, each arranged about the perimeter or peripheral wall and equally displaced about the outlet box body, preferably associated with, or extending from, the base wall, may also be possible.

In a further preferred embodiment, the external retaining tab is associated with the base of the outlet box and comprises elongated slots for mounting the outlet box body, typically onto a wall or ceiling. In this way, mounting mechanisms that have been received into the slots may be temporarily loosened to permit the outlet box body to be rotated or axially moved or adjusted while maintaining the mounting mechanisms in the slot. This can be done for several reasons including to permit the cable conduits (which may have been cemented or otherwise fixed in place after construction and/or installation and/or after mounting of the outlet box) to be better aligned with, and therefore better connected to, the apertures of the outlet box body. In this way, the external retaining tab may also be used for mounting the outlet box which may further improve the versatility and robustness of the outlet box.

An advantage of a further preferred embodiment relates to having opposed mounting feet with mounting openings in addition to the elongated mounting slots. The mounting feet and mounting openings may provide for mounting of the body to narrow bases and may be used in cases where mounting slots are not practical. Preferably, the mounting feet are separated from each other and may be on opposite sides of the outlet body perimeter or peripheral wall. The mounting feet may also be located intermediately between the external retaining tabs to improve the potential mounting options of the outlet box.

Further aspects of the invention will become apparent upon reading the following detailed description and drawings, which illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

Preferred embodiments of the invention and its advantages can be understood by referring to the present drawings. In the present drawings, like numerals are used for like and corresponding parts of the accompanying drawings.

Figure 3A:
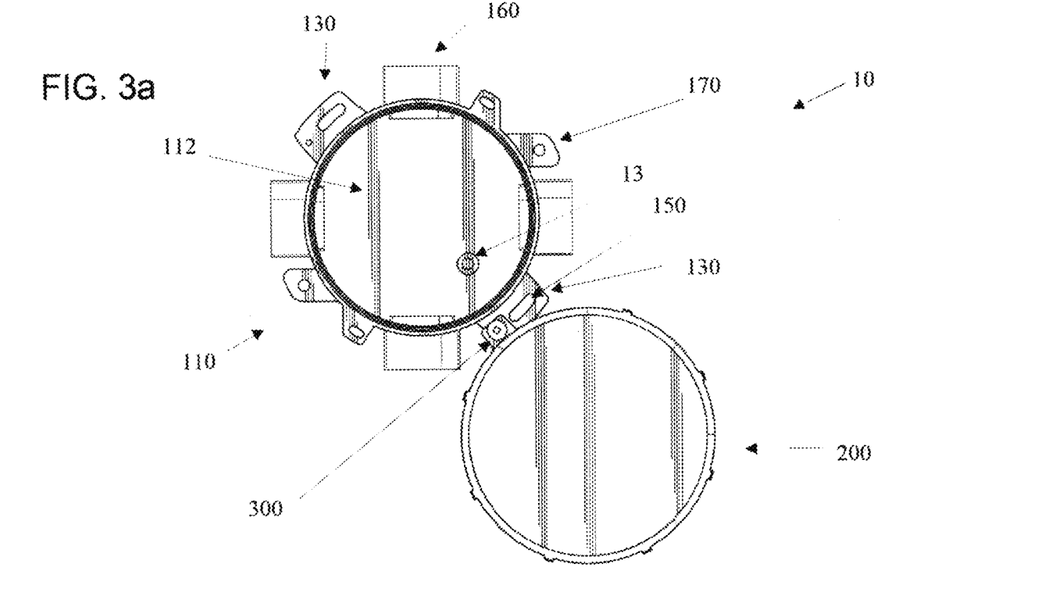
FIG. 3a is a top plan view of the outlet box comprising the box body and lid with the lid in the open configuration according to one preferred embodiment of the present invention.
Figure 3B:
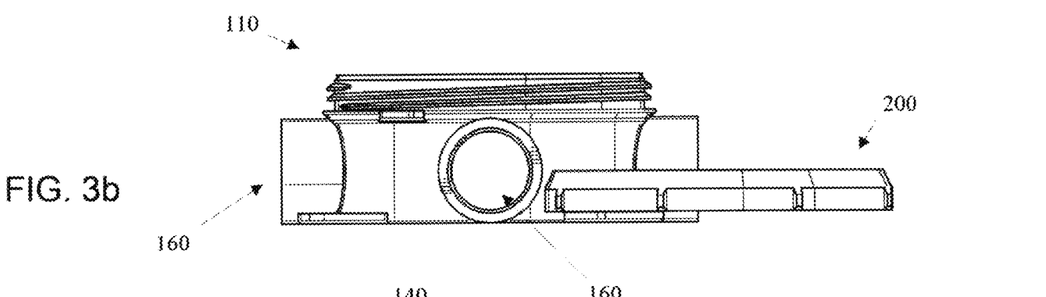
FIG. 3b is a side elevational view of the outlet box comprising the box body and lid shown in FIG. 3a in the open configuration according to one preferred embodiment of the present invention.
Figure 3C:
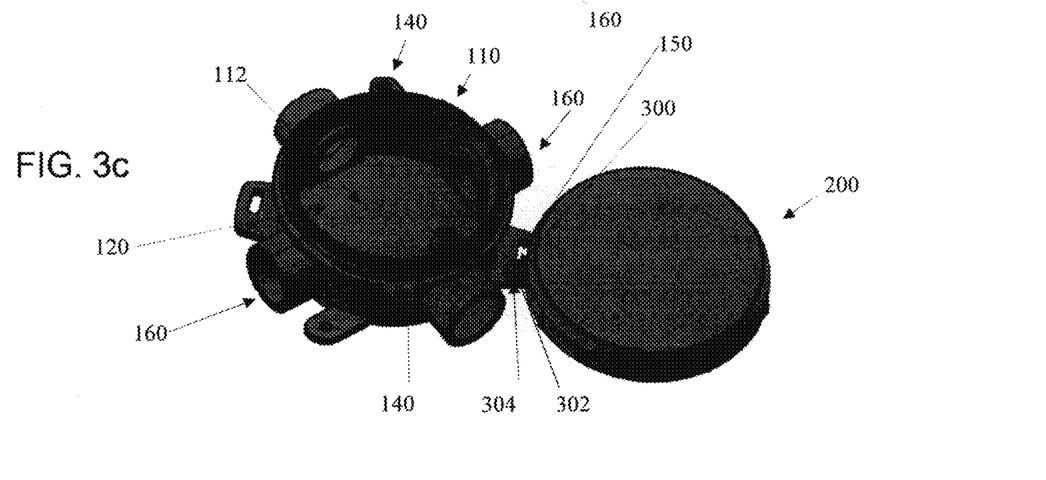
FIG. 3c is a top perspective view of the outlet box comprising the box body and lid shown in FIG. 3a in the open configuration according to one preferred embodiment of the present invention.
Figure 4A:
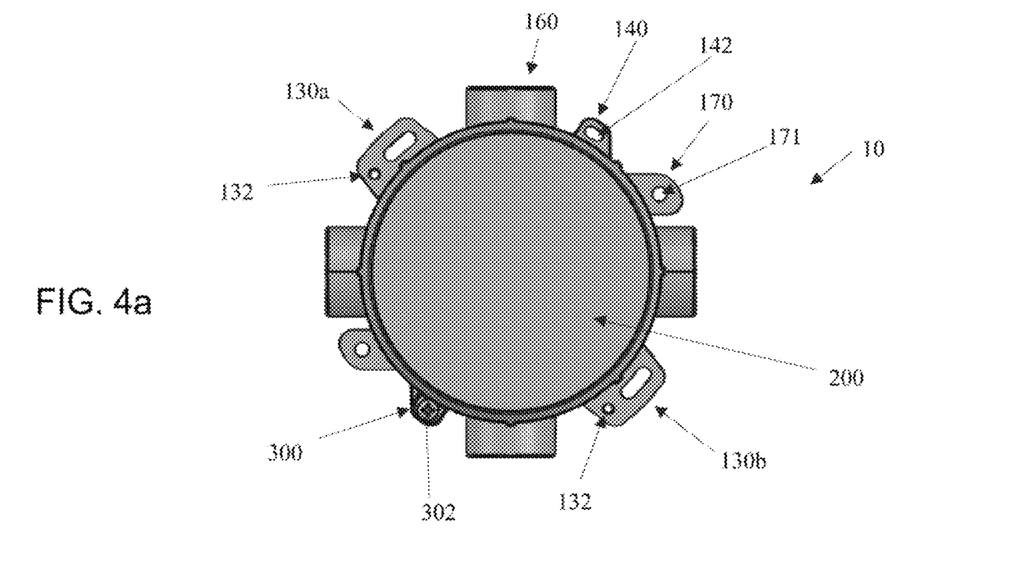
FIG. 4a is a top plan view of the outlet box comprising the box body and lid with the lid in the closed configuration according to one preferred embodiment of the present invention.
Figure 4B:
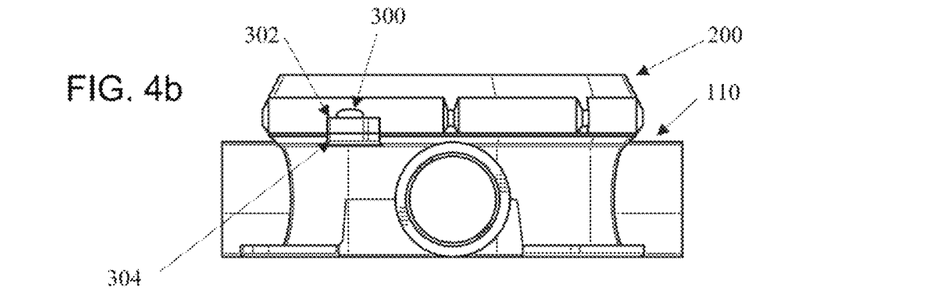
FIG. 4b is a side elevational view of the outlet box shown in FIG. 4a with the lid in the closed configuration according to one preferred embodiment of the present invention.
Figure 4C:
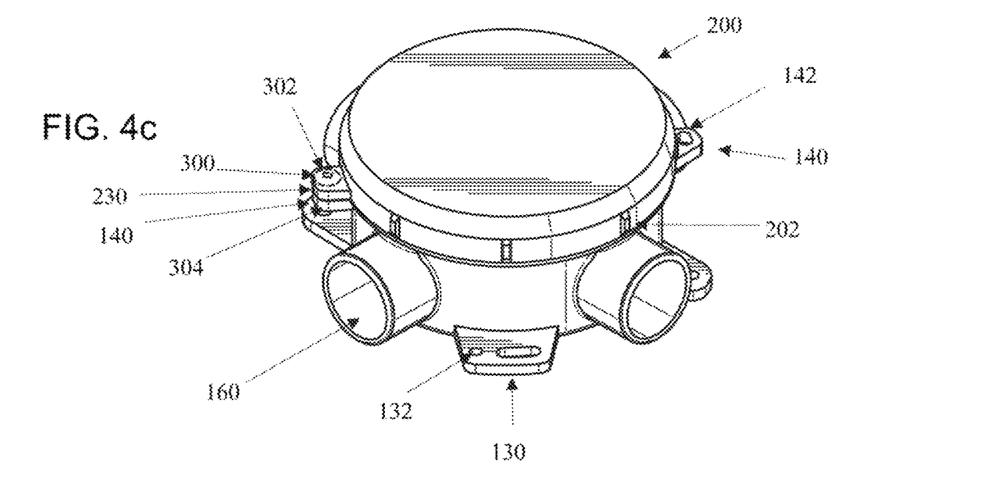
FIG. 4c is a top perspective view of the outlet box shown in FIG. 4a with the lid in the closed configuration according to one preferred embodiment of the present invention.

As shown in FIG. 3a, 3b, 3c and FIGS. 4a, 4b, 4c, in one preferred embodiment, the present invention relates to an outlet box, shown generally by reference 10, comprising a box body 110 and a lid 200. FIGS. 3a-3c illustrate the lid 200 releasably attachable to the box body 110 in an open configuration, which permits access to an internal space 112 through the lid opening 120 of the box body 110. FIGS. 4a, 4b and 4c illustrate the lid 200 releasably attached to the lid opening 120 in a closed configuration, which prevents access to the internal space 112 of the box body 110 through the lid opening 120. It is understood that, even with the lid 200 in the closed configuration, access to the internal space 112 may be possible through other openings, other than the lid opening 120, such as through the apertures 160. Typically, the apertures 160 would be connected to tubing, such as electrical conduits 9, or, cable glands (not shown), or, if not connected or used, may be blocked off. For instance, the outlet box may optionally comprise plugs (not shown) to block off apertures 160 which are not connected to an element, such as a conduit 9 or cable gland (not shown).

Figure 1A:
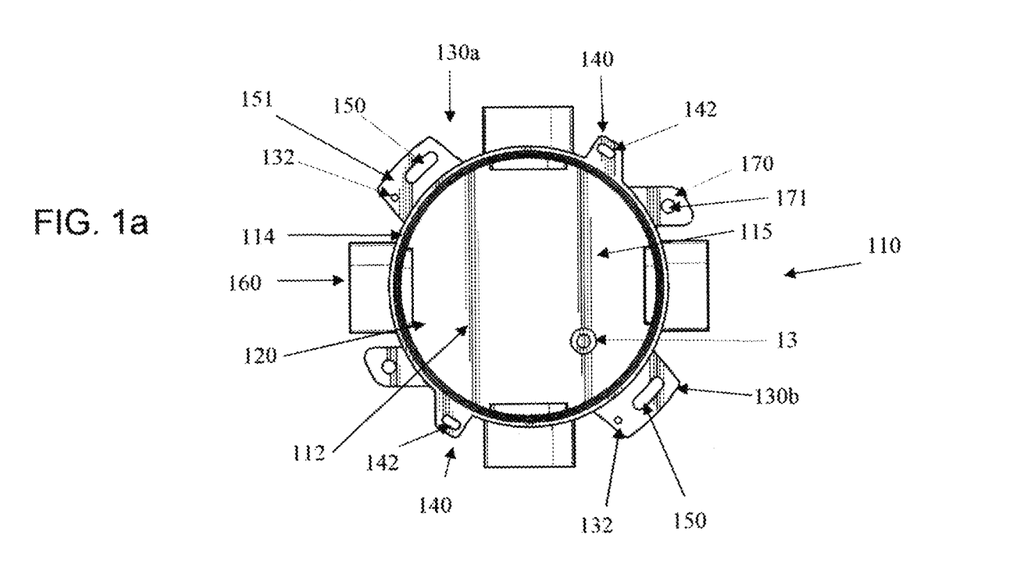
FIG. 1a is a top view of the box body according to one preferred embodiment of the present invention.
Figure 1B:
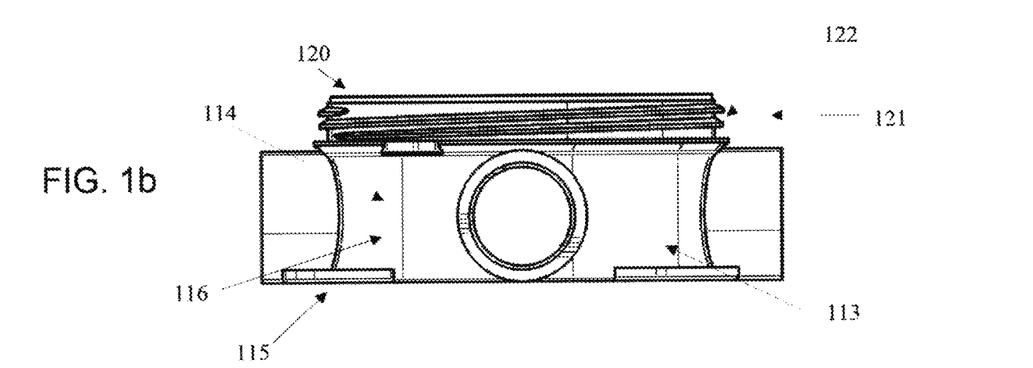
FIG. 1b is a side view of the box body shown in FIG. 1a according to one preferred embodiment of the present invention.
Figure 1C:
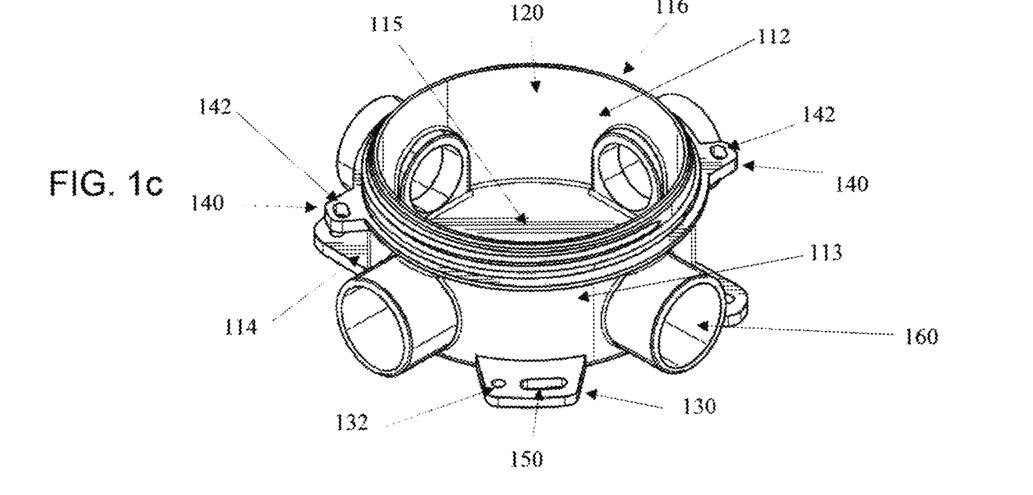
FIG. 1e is a top perspective view of the box body shown in FIG. 1a according to one preferred embodiment of the invention.
Figure 2A:
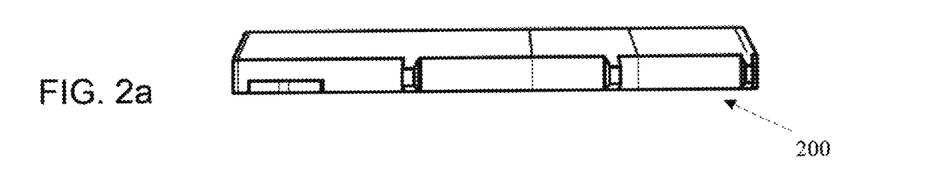
FIG. 2a is a side elevational view of the lid according to one preferred embodiment of the present invention.
Figure 2B:
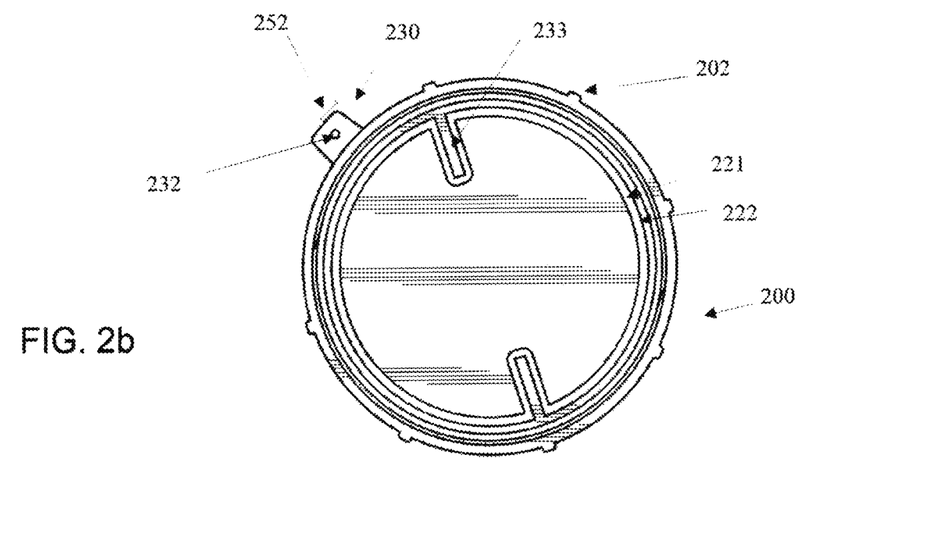
FIG. 2b is a bottom elevational view of the lid shown in FIG. 2a according to one preferred embodiment of the present invention.
Figure 2C:
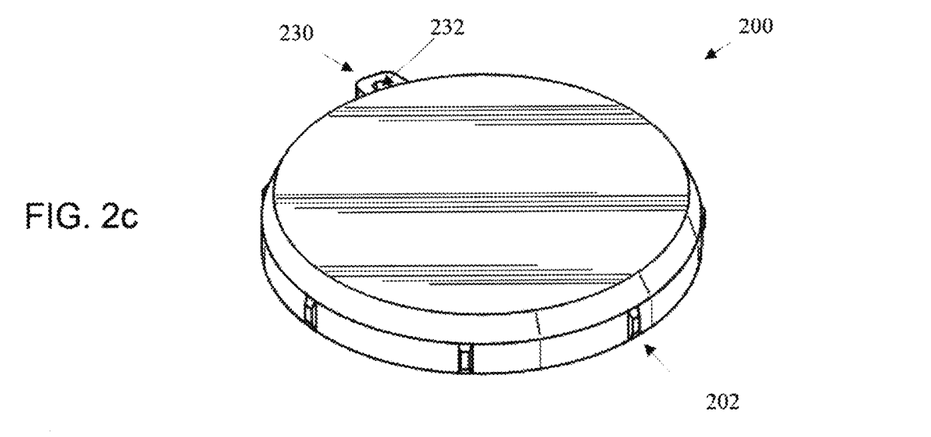
FIG. 2c is a top perspective view of the lid shown in FIG. 2a according to one preferred embodiment of the present invention.

FIGS. 1a-1c illustrate the box body 110 in more detail, according to one preferred non-limiting embodiment of the present invention. FIGS. 2a-2c illustrate the lid 200 in more detail, according to one preferred non-limiting embodiment of the present invention.

In a preferred embodiment, as illustrated for instance in FIGS. 1a and 1c, as well as FIGS. 3a and 3c, the box body 110 preferably has walls, identified generally by reference numeral 114, which walls 114 define the internal space 112. The internal space 112 may be a space within the box body 110 through which cables 6, or other components 8, may pass through, or be connected, as illustrated for instance in FIGS. 6 and 7.

In a further preferred non-limiting embodiment, the walls 114 may comprise a base wall 115 opposed from the lid opening 120. The walls 114 may also comprise a peripheral side wall 116 separating the base wall 115 from the opposed lid opening 120 to define the internal space 112 therein.

The lid opening 120 permits access to the internal space 112 when the lid opening 120 is not covered. For instance, in one preferred non-limiting embodiment, the lid opening 120 may be covered by the lid 200 in the closed configuration. Therefore, in one preferred non-limiting embodiment, the lid 200 may be releasably attachable to the lid opening 120 of the box body 110 in a closed configuration which prevents access to the internal space 112 of the box body 120 through the lid opening 120.

The box body 120 may also comprise an external retaining tab, shown generally by reference numeral 130, which is located externally from the internal space 112. In other words, the retaining tab 130 is not located within the internal space 112 but, rather, externally from the box body 110. The lid 200, in one preferred embodiment, is releasably attachable to the external retaining tab 130 in an open position. In other words, the lid 200 may be releasably attachable to the external retaining tab 130, which is located externally of the internal space 112 such that, when the lid 200 is releasably attachable to the retaining tab 130 in the open configuration, access is permitted to the internal space 112 through the lid opening 120. Thus, by having the lid 200 releasably attachable to the box body 110 in an open configuration, the lid 200 may be releasably attached or secured to the box body 110 thereby avoiding loss or damage of the lid 200, while at the same time, access is permitted to the internal space 112 of the box body 110 of the outlet box 10. In this way, cable 6 and or components 8 may be installed in the outlet box 10 and/or passed through the internal space 112 of the box body 110, while the lid 200 is releasably attached to the external retaining tab 130 in an open configuration permitting access to the internal space 112 through the lid opening 120. It is understood that the box body 110 may be mounted or installed when the lid 200 is releasably attached in the open configuration.

In a further embodiment, the lid 200 comprises a peripheral projection 230 for releasably attaching the lid 200 to the external retaining tab 130 in the open configuration. The lid 200 may be releasably attached to the external retaining tab 130 in a number of different ways, such as through an adhesive, a touch fastener such as a "hoop and loop" fastener, or even double-sided tape applied to the retaining tab 130 and the peripheral projection 230.

However, in a preferred non-limiting embodiment, the peripheral projection 230 of the lid 200 comprises a peripheral opening 232, and, the external retaining tab 130 comprises a retaining opening 132 such that the peripheral opening 232 and retaining opening 132 are sized to receive an attaching mechanism 300 therethrough when aligned. In this preferred embodiment, relative alignment of the peripheral opening 232 on the peripheral projection 230 with the retaining opening 132 on the external retaining tab 130 permits the attaching mechanism 300 to be received through the peripheral opening 232 and the retaining opening 132 to releasably attach the lid 200 to the external retaining tab 132 in the open configuration. In this way, the lid 200 may be releasably attached to the external retaining tab 132 in the open configuration which permits access to the internal space 112 through the lid opening 120.

In a further preferred non-limiting embodiment, the walls 114 of the box body 110 may comprise a base wall 115 with the peripheral side wall 116 affixed or molded to the based wall 115 and extending substantially perpendicularly from the base wall 115. In this way, the peripheral side wall 116 and base wall 115 may together define the internal space 112 therein. In this embodiment, the internal space 112 is located between the peripheral side wall 116 and the base wall 115 with the base wall 115 facing the lid opening 120. In this preferred non-limiting embodiment, the external retaining tab 130 extends from a surface 113, as shown for instance in FIG. 1*c*, which surface 113 is external of the internal space 112 of the outlet box body 110 and near the base wall 112. In this preferred embodiment, the external retaining tab 130, having the retaining opening 132, is remote from the lid opening 120. In this way, when the lid 200 is releasably attached to the box body 110 by being releasably attached to the external retaining tab 130, the lid 200 is also located remotely from the lid opening 120 so as to not interfere with access to the internal space 112 of the box body 110.

In a further preferred non-limiting embodiment, the external retaining tab 130 extends from a surface 113 external of the internal space 112 of the outlet box body 110 and, also, near the base wall 115. In a further preferred non-limiting embodiment, the external retaining tab 130 extends planarly from the base wall 115 of the outlet box body 110, and the retaining opening 132 is substantially normal to the base wall 115. Accordingly, in these preferred embodiments, when the lid 200 is releasably attached to the external retaining tab 130, the lid 200 will also be external of the internal space 112 and near the base wall 115 which is separated from the lid opening 120 by the peripheral walls 116.

As indicated above, FIGS. 4*a*, 4*b* and 4*c* illustrate the outlet box 10 with the lid 200 releasably attached to the lid opening 120 in a closed configuration. As illustrated in FIGS. 4*a*, 4*b* and 4*c*, the lid 200 covers or occludes the lid opening 120 in the closed configuration preventing access to the internal space 112 of the box body 110 through the lid opening 120. This, for example, would protect the internal space 112 and the cable 6 or components 8 that are contained in the internal space 112. This type of protection can be both for security as well as preventing damage due to the weather or other types of external elements.

The lid 200 can be releasably attached to the lid opening 120 of the box body 110 in the closed configuration in a number of different known ways. For instance, the lid 200 could snap on the lid opening 120 or could lock in place by an external lock or other element (not shown). Other different ways of potentially releasably attaching the lid 200 to the lid opening 120 would include adhesives (which could be dissolvable to permit re opening), touch fasteners such as "hoop and loop" fasteners, or even double-sided tape applied to the lid opening 120 and lid 200.

However, in a preferred non-limiting embodiment, the lid opening 120 comprises first threads 121 which mate with second threads 221 on the lid 200. In this way, relative manual rotation of the lid 200 with respect to and adjacent the lid opening 120 causes the first and second threads 121, 221, to rotationally engage thereby releasably attaching the lid 200 to the lid opening 120 in the closed configuration covering the lid opening 120 and preventing access to the internal space 112. In a further preferred embodiment, the first threads 121 are 2-start threads 122 and the second threads 221 are mating 2-start lid threads 222. In this way, the lid 200 may be releasably attached to the lid opening 120 by the relative manual rotation of the lid 200 with respect to and adjacent the lid opening 120. In a preferred embodiment, where the first threads 121 are 2-start threads 122 and the second threads 221 are mating 2-start second threads 222, the 2-start threads 122, 222 may permit faster releasable attachment of the lid 200 to the lid opening 120 than traditional start threads. Furthermore, a smaller range of relative manual rotation of the Rd 200 with respect to the lid opening 120, such as 120 degrees, may be required if 2-start threads 122, 222, are used. In addition, to facilitate the relative manual rotation of the lid 200, the lid 200 may have axial gripping ridges 202, according to a preferred non-limiting embodiment, to facilitate manual rotation.

In a further preferred non-limiting embodiment, the lid 200 may comprise a co-molded gasket 233 as shown for example in FIG. 2*b*, to seal the internal space 122 when the lid 200 is releasably attached to the lid opening 120 in the closed configuration. In this way the lid 200 better protects the internal space 122 from the weather or other external elements. The co-molded gasket 233 may molded directly on to a trench along the under surface of the lid 200. In this way, the co-molded gasket 233 would remain on the lid 200, avoiding the risk of the co-molded gasket 233 being removed and/or lost. Also, by having a co-molded gasket 233 directly on the undersurface of the lid 200, the lid 200 and co-molded gasket 233 would act as a single element decreasing the number of components of the outlet box 10.

In a further preferred non-limiting embodiment, the outlet box 10 may comprise a tamper resistant tab, shown generally by reference numeral 140, associated with the lid opening 120. Furthermore, the outlet box 10 could have more than one, and possibly several, tamper resistant tabs 140. As illustrated, for instance, in FIGS. 1*a* and 1*c*, in one preferred non-limiting embodiment, the outlet box 10 may have two tamper resistant tabs 140, preferably located opposite to each other on the lid opening 120. In the preferred embodiment where the lid opening 120 is circular, the tamper resistant tabs 140 could be located diametrically opposed to each other and along the circumference of the lid opening 120.

Each tamper resistant tab 140 may have a tamper resistant opening 142 sized for receiving the attaching mechanism 300. The relative alignment of the peripheral opening 232 of the peripheral projection 230 with the tamper resistant opening 142 of the tamper resistant tab 140 when the lid 200 is in the closed configuration, permits the attaching mechanism 300 to be received therethrough to releasably secure the lid 200 to the outlet box body 110 in the closed configuration. This is illustrated, for instance, in FIGS. 4*a*, 4*b* and 4*c* where the attaching mechanism 300 is shown as being received through the peripheral opening 232 of the peripheral projection 230 as well as the tamper resistant opening 142 of the tamper resistant tab 140. Accordingly, when the attaching mechanism 300 has been received through the relatively aligned peripheral opening 232 and tamper resistant opening 142, with the lid 200 in the closed configuration, the attaching mechanism 300 prevents manual rotation of the lid 200 with respect to the box body 110. In this way, the attaching mechanism 300 releasably secures the lid 200 to the outlet box 110 in the closed configuration because, relative manual rotation of the lid 200 with respect to the box body 110 is prevented while the attaching mechanism 300 is received through the relatively aligned tamper resistant opening 142 and peripheral opening 232.

It is understood that in embodiments where the outlet box 10 may have more than one tamper resistant tab 140, the attaching mechanism 300 may pass through only one of the tamper resistant openings 142 of one of the tamper resistant tabs 140. However, having additional tamper resistant tabs 140 located at different locations about the lid opening 120 permits a lid 200 to be releasably secured to the outlet box body 110 at different positions and, in cases where the lid opening 120 is circular, at different angular positions along the lid opening 120. This is useful when, as indicated above, the lid 200 may be releasably attached to the lid opening 120 using mating first and second threads 121, 221, and, in particular, 2-start threads 122, 222, which may permit the lid 200 to be releasably, attached or tightened at different angular positions along the lid opening 120. For instance, in cases where the mating first and second threads 121, 221 comprise 2-start threads 122, 22, the lid 200 may only need to rotate about 120 degrees with respect to the lid opening 120 to releasably attach the lid 200 to the lid opening 120. In this way, the 2-start threads 122, 222 will eventually stop the rotation of the lid 200 with respect to the lid opening 120 at two possible angular positions. This facilitates the arrangement of the tamper resistant tabs 140, and the tamper resistant openings 142, at the two angular positions where the 2-start threads 122, 222 are expected to prevent further relative rotation of the lid 200 with respect to the lid opening 120, and facilitate relative alignment of the peripheral opening 232 with one of the two tamper resistant openings 142 at these predetermined angular positions.

In a further preferred non-limiting embodiment, the attaching mechanism 300 may comprise a tool engagement surface 302 requiring a tool (not shown) to remove the attaching mechanism 300 from the tamper resistant opening 142 to unsecure the lid 200 from the lid opening 120 in the closed configuration. In this way, the attaching mechanism 300 cannot be manipulated by hand only. Thus, to unsecure the lid 200 from the lid opening 120, and permit rotation of the lid 200 with respect to the lid opening 120 to releasably de-attach the lid 200 from the lid opening 120, it is necessary that a tool (not shown) be used to engage the tool engagement surface 302 in order to remove the attaching mechanism 300 from the tamper resistant opening 142.

In a further preferred embodiment, when the attaching mechanism 300 is removed from the tamper resistant opening 142 to permit the lid 200 to be unsecured from the lid opening 120, the attaching mechanism 300 may remain received to the peripheral opening 232. This permits easier removal of the attaching mechanism 300 from the tamper resistant opening 142. This also facilitates the attaching mechanism 300 continuing to be received by the lid opening 120 so as not to be lost, for instance, if the lid 200 is being rotated or temporarily releasably detached, so as to permit access to the internal space 122.

Accordingly, in this preferred embodiment, when the tamper resistant opening 142 and the peripheral opening 232 are aligned and have received the attaching mechanism 300 therethrough with the lid 200 in the closed configuration, relative manual rotation of the lid 200 with respect to the lid opening 120 is prevented. This adds additional security to the outlet box 10 by preventing manual or accidental rotation of the lid 200 with respect to the box body 110 which could result in loosening or removal of the lid 200 from the box body 110. Furthermore, as the attaching mechanism 300 requires a tool (not shown) for removal, the lid 200 cannot be unintentionally rotated and, therefore releasably removed from the lid opening 120, by hand or without the use of the appropriate tool (not shown), while the attaching mechanism 300 is received within the relatively aligned tamper resistant opening 142 and peripheral opening 232.

Furthermore, after the tamper resistant opening 142 and the peripheral opening 232 have received the attaching mechanism 300 therethrough with the lid 200 in the closed configuration, relative manual rotation of the lid 200 with respect to the lid opening 120 to remove the lid 200 is prevented until after the attaching mechanism 300 has been removed from the tamper resistant opening 142. As the attaching mechanism 300 requires a tool (not shown) for removal, this further improves the security of the outlet box 10 by preventing manual rotation and, therefore removal, of the lid 200 with respect to the lid opening 120 until the appropriate tool (not shown) is used to remove the attaching mechanism 300 from the tamper resistant opening 142.

In a further preferred embodiment, the attaching mechanism 300 optionally releasably attaches the lid 200 to the outlet box body 120 in the open configuration by being received through the relatively aligned peripheral opening 232 and retaining opening 132. Furthermore, the same attaching mechanism 300 may optionally prevent relative manual rotation of the lid 200 with respect to the box body 120 by being received through the relatively aligned peripheral opening 232 and the tamper resistant opening 142 when the lid 200 is in the closed configuration. Accordingly, in this preferred embodiment, the same attaching mechanism 300 may optionally be used both to releasably attach the lid 200 to the retaining opening 132 of the external retaining tab 130 in the open configuration, as well as being received by the relatively aligned peripheral opening 232 and tamper resistant opening 142 when the lid 200 is in the closed configuration. This decreases the number of components for the outlet box 10 by having the same attaching mechanism 300 optionally do two different tasks, namely, releasably attach the lid 200 to the external retaining tab 130 in the open configuration, and, prevent manual rotation of the lid 200 with respect to the box body 110 in the closed configuration. Furthermore, the same attaching mechanism 300 may remain partially received in the peripheral opening 232 of the peripheral projection 230 while the lid 200 is being moved from the open configuration (after the attaching mechanism 300 has been removed from the retaining opening 132) to the closed configuration (before the attaching mechanism 300, which is received in the peripheral opening 232, is fully received in the tamper resistant opening 142). In this way, the attaching mechanism 300 may remain in the peripheral opening 232 while the lid 200 is moved to and from the open and closed configurations.

It is understood that the attaching mechanism 300 may be any type of attaching mechanism, such as screws or bolts. In a further preferred non-limiting embodiment, the attaching mechanism 300 preferably comprises a longitudinal portion 304 extending from the tool engagement surface 302. The longitudinal portion 304 is sized and shaped to be received by the tamper resistant opening 142, the retaining opening 132 and the peripheral opening 232 with the tool engagement surface 302 extending therefrom. In this way, the tool engagement surface 302 extending from the peripheral opening 232 is accessible while the longitudinal portion 304 of the attaching mechanism 300 has been received through the peripheral opening 232 of the peripheral projection 230 whether the attaching mechanism 300 has also been received, or is being received, by the tamper resistant opening 142 or the retaining opening 132. It is understood that the longitudinal portions 304 being sized and shaped to receive by the tamper resistant opening 142, the retaining opening 132 and the peripheral opening 232 also requires the longitudinal portion 304 not to unintentionally engage other elements. For instance, when the attaching mechanism 300 is received by the retaining opening 132 and the peripheral opening 232, the longitudinal portion 304 should not extend excessively below or beyond the back surface of the base wall 115 because the box body 110 will typically be mounted on to another element, such as support surface 5 discussed below, when the lid 200 is releasably attached in the open configuration. Similarly, when the attaching mechanism 300 is received by the tamper resistant opening 142 and the peripheral opening 232, the longitudinal portion 304 should not exceed significantly beyond the tamper resistant opening 142 and longitudinally below the tamper resistant tab 140 in order to prevent potential damage thereto or interference with other elements. Accordingly, in one preferred non-limiting embodiment, the longitudinal portion 304 of the attaching mechanism 300 is preferably sufficiently long to accommodate the thickness of the peripheral opening 232 and the retaining opening 132 but not excessively longer. Similarly, the longitudinal portion 304 of the attaching mechanism 300 is preferably sufficiently long to accommodate the peripheral opening 232 and the tamper resistant opening 142.

In a further preferred embodiment, as illustrated in FIGS. 1a and 1c, the external retaining tab 130 may also optionally comprise an elongated mounting slot 150. The elongated mounting slot 150 preferably extends lengthwise substantially parallel to the peripheral side wall 116 for receiving a mounting mechanism 500 at different positions along the length of the elongated mounting slot 150 to mount the outlet box body 110. As illustrated for instance in FIGS. 5a, 5b and 5c, the box body 110 may be mounted by the mounting mechanism 500 to a support surface, shown generally by reference numeral 5. The support surface 5 may be any type of support upon which the outlet box body 110 may be mounted. For instance, the support surface 5 may be a wood or composite material, if the box body 110 is being mounted to a wall for instance. Alternatively, the support surface 5 may also be a concrete surface. In any case, receiving holes (not shown) may be drilled or otherwise created on the support surface 5 for receiving the mounting mechanism 500.

Figure 5A:
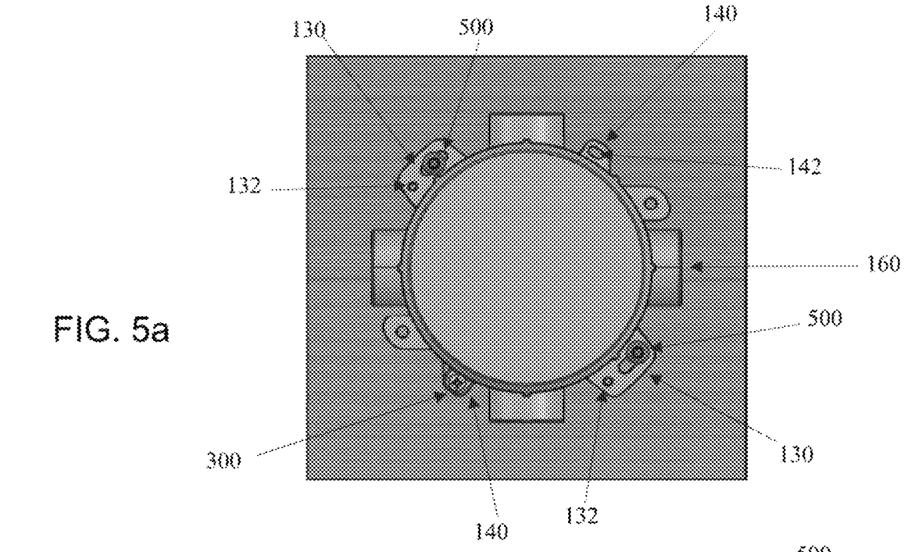
FIG. 5a is a plan view of the outlet box fixed to a support with a mounting mechanism in a semi-tightened position and with the lid in the closed configuration.
Figure 5B:
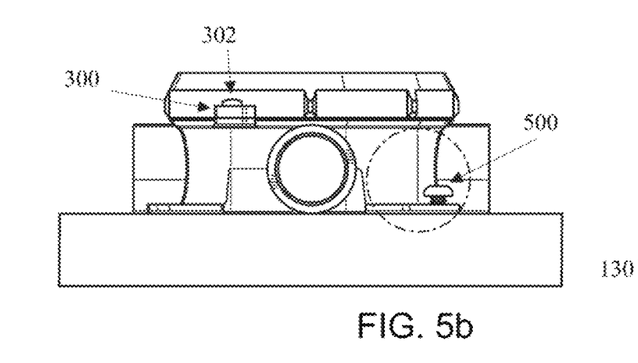
FIG. 5b is a side elevational view of the outlet box shown in FIG. 5a with a mounting mechanism in the semi-tightened position and the lid in a closed configuration
Figure 5C:
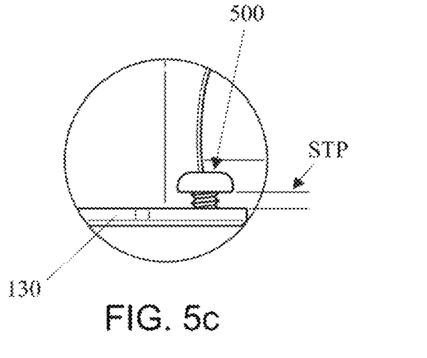
FIG. 5c is a detailed view of enlarged circle A shown in FIG. 5b illustrating the mounting mechanism in the semi-tightened position.

In a preferred embodiment, the mounting mechanism 500 may have a first semi-tightened position in the elongated mounting slot 150, shown for instance in FIGS. 5a, 5b and 5c, where the outlet box body 110 is fixed to the support surface 5, but, because the mounting mechanism 500 is in a semi-tightened position, relative movement of the outlet box body 110 with respect to the mounting mechanism 500 in the elongated mounting slot 150 may be permitted. This is illustrated for instance in enlarged detailed FIG. 5c where, in the semi-tightened position, shown by reference numeral STP in FIG. 5c, there is no frictional force or downward compression force from the mounting mechanism 500 on to the retaining tab 130 to fix the box body 110 to the support surface 5. Rather, in the semi-tightened position, the outlet box body 110 is movably mounted to the support surface 5 such that relative movement of the outlet box 110 with respect to the mounting mechanism 500 in the elongated mounting slot 150 is permitted. In this way, the box body 110 may be moved, such as rotated, while the mounting mechanism 500 is in the first semi-tightened position within the elongated mounting slot 150. This could be required, for instance, to better align the apertures 160 of the box body 110 with the corresponding electrical conduits 9. This may also be required where receiving holes (not shown) have been created in the support surface 5 for the mounting mechanism 500 and/or creating further receiving holes (not shown) may be difficult, such that relative movement of the box body 110 with respect to the mounting mechanism 500 and, by extension, the support surface 5 is preferred.

Figure 5D:
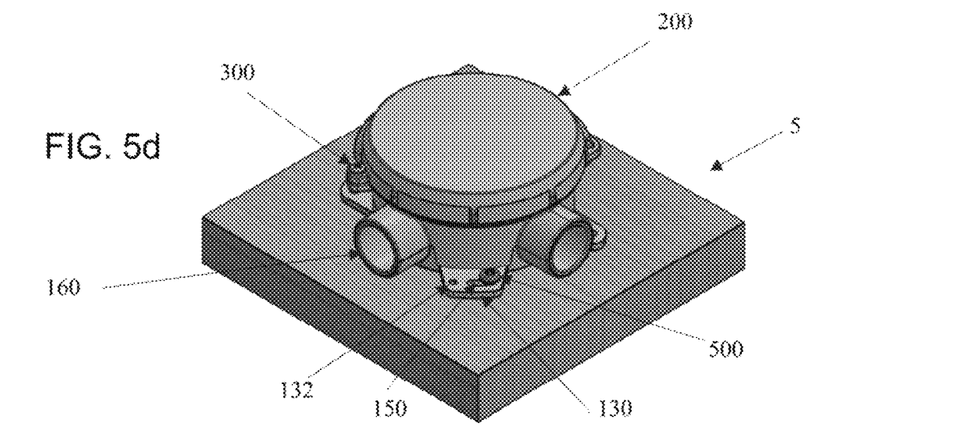
FIG. 5d is a top perspective view of the outlet box shown in FIG. 5a but with the mounting mechanism in the tightened position and the lid in the closed configuration.

When the box body 110 is in the desired position, the mounting mechanism 500 is further tightened to a second tightened position in the elongated mounting slot 150, shown for instance in FIG. 5d. In the second tightened position, the outlet box body 110 is immovably mounted to the support surface 5 such that relative movement of the outlet box body 110 with respect to the mounting mechanism 500 in the elongated slot 150 is restricted. For instance, the mounting mechanism 500, in the second tightened position, may exert a compression force frictionally holding the retaining tab 130 of the box body 110 in place on the support surface 5.

As illustrated in FIG. 5a, there may be two elongated mourning slots 150 associated with each box body 110, and, each elongated mounting slot 150 may receive one mounting mechanism 500. Alternate embodiments may have additional elongated mounting slots 150 located about the peripheral wall 116. In any case, the attaching mechanism 500 will permit relative movement of the outlet box 110 with respect to the mounting mechanism 500 in the corresponding elongated slots 150 when in the first semi-tightened position, and, will prevent relative movement of the box body 110 with respect to the mounting mechanism 500 in the corresponding elongated slot 150 in the second tightened position.

As illustrated in FIGS. 1a, 1c and 5a, 5c and 5c, the outlet box body 110 may comprise at least two substantially identical external retaining tabs 130 situated at substantially opposite end of the peripheral side wall 116. These substantially identical external retaining tabs 130 are identified as 130a and 130b in FIG. 1a. In cases where the peripheral side wall 116 is circular, the external retaining tabs 130a,b may be located at diametrically opposed locations of the peripheral side wall 116 as shown in FIG. 1a. If the peripheral side wall 116 has a different shape, such as square, octagonal, or other type of shape, the external retaining tabs 130 are preferably situated at an opposite mirror end thereof so that the mounting mechanisms 500 may better mount the box body 110 to the support surface 5. In either case, the elongated mounting slot 150 will extend lengthwise substantially parallel to the peripheral side wall 116, In a preferred non-limiting embodiment, the peripheral side wall 116 is cylindrical as shown in FIGS. 1a to 1c, and the elongated mounting slot 150 may extend substantially parallel thereto forming substantially an arc shape, to permit movement, such as relative rotation along the arc shaped elongated mounting slot 150, of the outlet box 110 with respect to the mounting mechanism 500, and thus the support 5, when the mounting mechanism 500 is in the first semi-tightened position.

As illustrated, for example, in FIGS. 1a and 1b, in a preferred non-limiting embodiment, the retaining opening 132 is adjacent the elongated mounting slot 150 on the retaining tab 130. Preferably, the retaining opening 130 is separated from the elongated mounting slot 150 by a first retaining distance 151. Preferably, the first retaining distance 151 is greater than a second peripheral distance 252, shown in FIG. 2b, representing the distance of the peripheral opening 232 to an edge of the peripheral projection 230 of the lid 200, as illustrated for instance in FIG. 2b. In this way, the peripheral projection 230 avoids obstructing the elongated mounting slot 150 when the lid 200 is releasably attached to the external retaining tab 130 in the open configuration. Accordingly, the mounting mechanism 500 may be received in the elongated mounting slot 150 while the lid 200 is releasably attached to the external retaining tab 130 in the open configuration. Also, the lid 200 in the open configuration will not interfere with any mounting mechanism 500 that has been received by the elongated mounting slot 150.

In a further preferred non-limiting embodiment, the peripheral side wall 116 comprises apertures 160 extending into the external space 112, as discussed above. The apertures 116 are connectable to corresponding conduits 9 or cable glands (not shown). Alternatively, if the apertures 160 are not used, they can be blocked off. When the mounting mechanism 500 is in the first semi-tightened position, the outlet box 150 may be relatively moved with respect to the mounting mechanism 500 within the elongated mounting slots 150 to better align the apertures 160 with the corresponding electrical conduits 9. In other words, the mounting mechanism 500 in the first semi-tightened position permits relative movement of the outlet box body 110 with respect to the mounting mechanism 500 lengthwise along the elongated mounting slot 150 while the outlet box body 110 is moveably mounted to the support surface 5 to facilitate alignment of one or more apertures 160 with the corresponding conduits 9 to permit connection therewith. This could be the case, for instance, lithe electrical conduits 9 have been installed in a structure after the initial installation of the outlet box 10. This could also be the case if the electrical conduits 9 have moved during construction or installation. Once the apertures 160 of the outlet box 10 have been properly aligned with the corresponding conduits 9 to permit connection therewith, the mounting mechanism 500 can be tightened from the first semi-tightened position to the second tightened position to immovably mount the box body 110 to the support 5.

Also, to ensure that the external retaining tabs 130 can be properly accessed, it is preferred that the apertures 160 are located remotely from the external retaining tabs 130 so that the external retaining tabs 130 are unobstructed by the apertures 160. For instance, in a preferred non-limiting embodiment, where the peripheral side wall 116 is substantially circular, the external retaining tabs 130 are preferably located radially remotely from the apertures 160 so that the external retaining tabs 130, and in particular the retaining opening 132 and the elongated mounting slot 150, are axially unobstructed by the apertures 160 and can be accessed in order to releasably attach the lid 200 to the external retaining tabs 130 in the open configuration and also mount the box body 110 to the support surface 5 with the mounting mechanisms 500.

Figure 6:
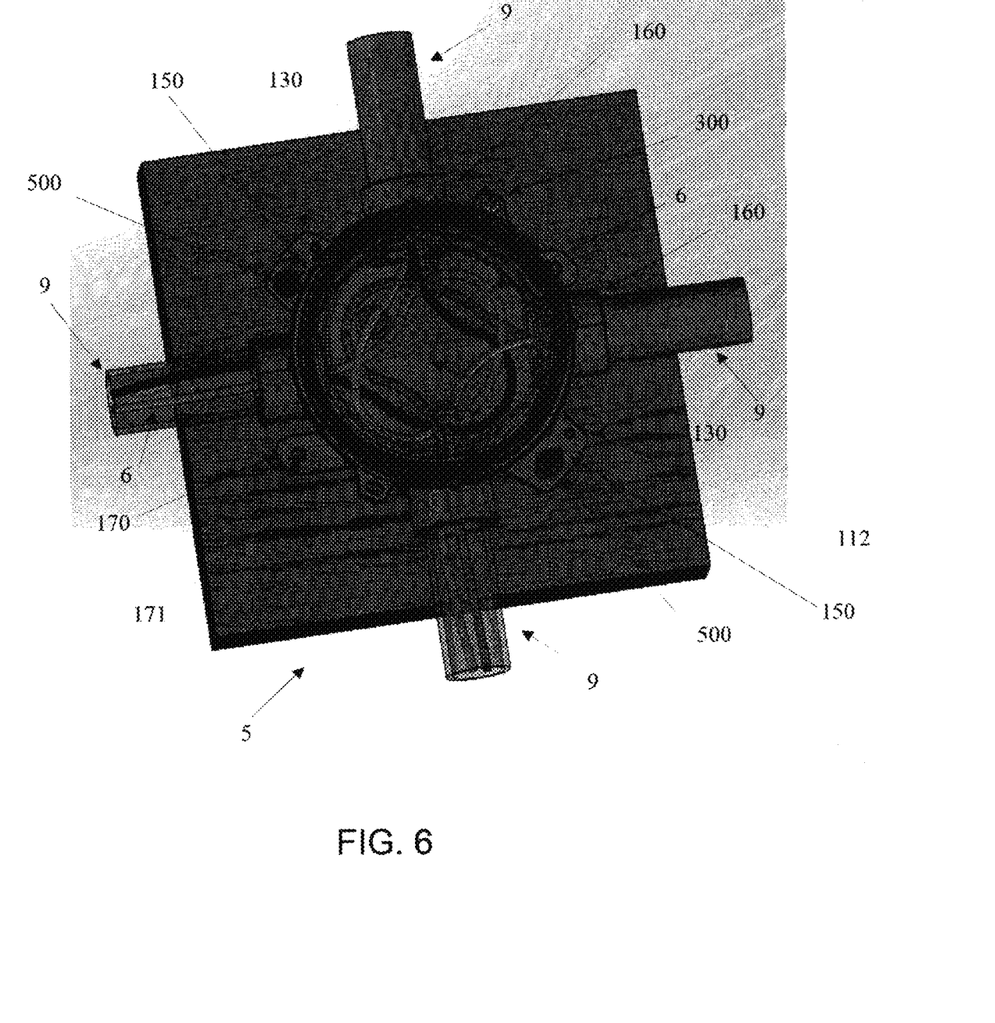
FIG. 6 is a top perspective view of the outlet box installed on a support surface with the lid and two conduits shown as transparent to illustrate the cables and components installed in the outlet box.

FIG. 6 illustrates a top perspective view of the outlet box 10 installed on a support surface 5 according to one preferred embodiment. The outlet box 10 has the apertures 160 connected to corresponding conduits 9. The lid 200 and two of the conduits 9 are shown as transparent for ease of illustration. The lid 200 is shown in the closed configuration with the attaching mechanism 300 received through the tamper resistant opening 142 and the peripheral opening 232 to prevent manual relative rotation of the lid 200 with respect to the box body 110. Accordingly, FIG. 6 illustrates the outlet box 10 as installed and with the mounting mechanism 500 in the second tightened position immovably mounting the box body 110 to the support surface 5. Cables 6 passing through the conduit 9 and into the apertures 160 enter the internal space 112 and may pass through other apertures 160 to other conduits 9.

In FIG. 6, the mounting mechanism 5 is shown as being in the second tightened position to immovably mount the outlet body 110 to the support surface 5 such that relative movement of the outlet box body 110 with respect to the mounting mechanism 500 and the elongated mounting slot 150 is restricted. As illustrated in FIG. 6, preferably the outlet box 10 will have more than one, and in this case two, external retaining tabs 130, each of which having an elongated mounting slot 150 for receiving the mounting mechanism 500 at different positions along the length of the elongated mounting slot 150 to mount the outlet box body 110 accordingly. For instance, the mounting mechanism 500 may have been in the first semi-tightened position, movably mounting the outlet box body 110 to the support surface 5 thereby permitting relative movement of the outlet box body 110 with respect to the mounting mechanism 500 in the elongated slot 150 to facilitate alignment of one or more of the apertures 160 with the corresponding electrical conduits 9 to permit connection therewith.

In FIG. 6, the retaining opening 132 is shown in both retaining tabs 130. As the lid 200 is in the closed configuration, the attaching mechanism 300 is no longer present in the retaining opening 132 and, rather, it is not used at this point given that the lid 200 is in the closed configuration. As discussed above, access to the internal space 112 through the lid opening 120 is not possible, given that the lid 200 is in the closed configuration. However, access to the internal space 112 is still possible through the apertures 160 which are connected to corresponding conduits 9. It is understood that if an aperture 160 is not connected to a conduit 9, the aperture 160 may be connected to another type of element, such as cable glands (not shown). In the still further alternative, the aperture 160 could be closed or blocked off if the aperture 160 is not required. For instance, the aperture 160, if not used, may be blocked oft such as by means of a plug (not shown) or other manner as is known in the art.

Figure 7:
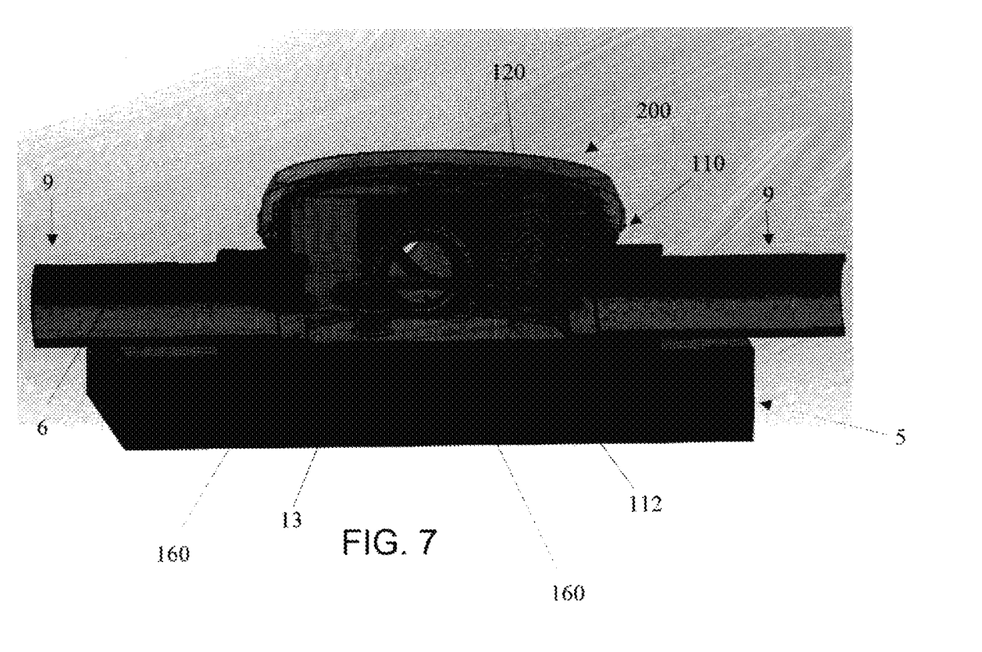
FIG. 7 is a cross-sectional view of an outlet box shown in FIG. 6 illustrating the conduits and cables passing therethrough.
Figures 8A, 8B, 8C, 8D:
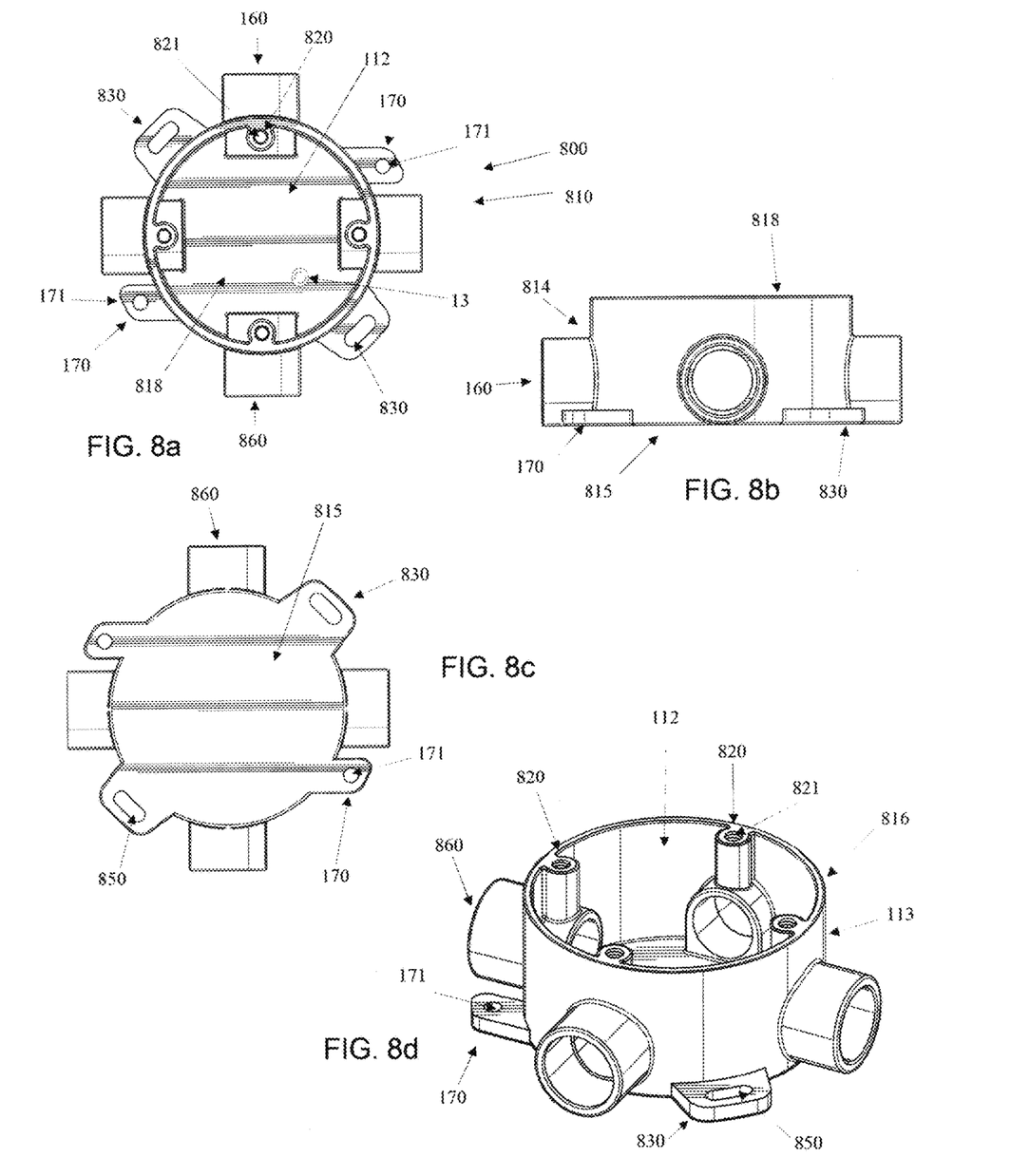
FIG. 8a is a top plan view of the box body according to a further preferred embodiment.
FIG. 8b is a side elevational view of the box body shown in FIG. 8a according to a further preferred embodiment.
FIG. 8c is a bottom plan view of the box body shown in FIG. 8a according to a further preferred embodiment.
FIG. 8d is a top perspective view of the box body shown in FIG. 8a according to a further preferred embodiment.

FIG. 7 illustrates a cross-sectional view of the outlet box 10. As illustrated in FIG. 7, two of the conduits 9 are shown in cross-sectional view with the cables 6 passing through the aperture 160 into the internal space 112. The lid 200 is releasably attached to the box body 110 in the closed configuration to cover the lid opening 120. FIG. 7 also shows a grounding opening 13 in the internal space 112, the grounding opening 13 may receive a grounding screw (not shown) as may be required in certain embodiments and for some jurisdictions to facilitate grounding of components 8 or cables 6 in the internal space 112. The grounding opening 13 may, in a preferred embodiment, have a metal threaded insert to which the grounding screw 13 may be releasably attached and potentially electrically grounded.

As also illustrated in FIGS. 1a, 4a, 5a and 6, the outlet box 10 may also comprise at least two mounting feet, shown generally by reference numeral 170. The mounting feet 170 may comprise at least one mounting hole 171. The mounting feet 170 are preferably situated at opposite ends of the peripheral side wall 116 and intermediately between the substantially identical external retaining tabs 130. In cases where the outlet box 10 has two or more external retaining tabs 130, the at least two mounting feet 170 are preferably situated between identical external retaining tabs 130 and oriented on opposite ends of the peripheral side wall 116 so as to provide different options for mounting a box body 110 to the support surface 5. For example, the mounting feet 170 preferably have mounting holes 171 for receiving the mounting mechanism 500 in a tightened position where the outlet box body 110 is fixed to the support surface 5 and relative movement of the outlet box body 110 with respect to the mounting mechanism 500 and the mounting feet 170 is restricted. The mounting feet 170 therefore do not have the advantage of permitting the box body 110 to be movably mounted to the support surface 5, as was discussed above with respect to the elongated mounting slot 150 of the retaining tabs 130. However, the mounting feet 170 may be used in cases where the elongated mounting slots 150 are not practical. This could occur, for instance, when the box body 110 is to be mounted to narrow bases or support surfaces 5. In these cases, the mounting feet 500 may be used or preferred because the elongated mounting slots 150 may not be practical. Preferably, the mounting feet 170 are separated from each other and may be on opposite sides of the outlet box body 110. Accordingly, the user may optionally choose to have mounting mechanisms 500 pass through both of the mounting holes 171 of the mounting feet 170 or the elongated mounting slots 150 of the external retaining tabs 130, as the particular situation may require or permit.

It is understood that the mounting mechanism 500 may be any type of mounting mechanism, such as screws or bolts. Furthermore, as illustrated in the figures, preferably, the mounting mechanisms 500 will pass through a hole (not shown) in the support surface or otherwise be mounted or fixed to the support surface 5 as is known in the art. Accordingly, it is understood that the attaching mechanism 500 may be any mechanism that can moveably mount the box 110 to the support surface 5 in the first semi-tightened position, and, immovably mount the box 110 to the support surface 5 in the second tightened position, such as bolts or screws or other types of mounting mechanisms.

FIGS. 8a to 8d illustrate a second preferred non-limiting embodiment, of an alternate outlet box, identified generally by reference numeral 800. Like numerals are used to denote like components. The alternate outlet box 800 has an outlet body 810 but may not have a lid. In this embodiment, the alternate outlet box 800 may be used, for example, with luminaires or other type of electrical components (not shown) which would fit over the opening 818 such that a lid (not shown) would not necessarily be required with this alternate outlet box 800. To facilitate attachment of these electrical components, such as luminaires (not shown) to the alternate outlet box 800, the body 810 may comprise two or more bosses 820 each with an opening 821 which may be threaded or have a threaded, preferably metal, insert (not shown) for receiving screws (not shown) to attach a luminaire (not shown) thereto.

As in the embodiment of the outlet box 10 shown in FIGS. 1 to 7, the alternate outlet box 800 has a box body 810 having walls 814 comprising a base wall 815 opposed from the opening 818 and a peripheral side wall 816 separating the base wall 815 from the opposed opening 818 to define the internal space 112. Therefore, the structure of the outlet box body 810 is similar to the box body 110 except that the opening 818 may optionally not have threads or other attaching mechanisms along its top or rim to releasably attach the body 810 to a lid (not shown) as a lid may not be required to be used with the alternate outlet box 800. Rather, as indicated above, threaded openings 821 and bosses 820 may be used to connect to an electrical component (not shown) which would cover or occlude the opening 818 thereby protecting the internal space 112 from external elements.

The peripheral side wall 816 is preferably affixed to and extends substantially perpendicularly from the base wall 815 to define the internal space 122 between the peripheral side wall 816 and the base wall 815 with the base wall 815 facing the opposed opening 818. The external retaining tabs 830 extend from a surface 113 external of the internal space 112 of the outlet box body 810 and near the base wall 815. In this alternate outlet box 800, a retaining opening 132 on the retaining tab 830 is not necessary as a lid (not shown) may not be used. However, a retaining opening 132 could be used on the retaining tab 830 if the option to attach a lid (not shown) may be desired or simply for the ease of molding.

As with the outlet box 10, the alternate outlet box 800 also comprises mounting feet 170 with mounting holes 171 for receiving a mounting mechanism 800 in a similar manner as discussed above with respect to outlet box 10.

The alternate outlet box 800 may have one or two or more external retaining tabs 830, located externally from the internal space 122, which would typically be similar to the external retaining tabs 130 of outlet box 10 except that they may not have a retaining opening 132. Each external retaining tab 830 may comprise an elongated mounting slot 850 extending lengthwise substantially parallel to the peripheral side wall 816 for receiving the mounting mechanism 500 at different positions along its length to mount the outlet box body 810 similar to the box body 110. The mounting mechanism 500, in a preferred non-limiting embodiment, may have a first semi-tightened position in the elongated mounting slot 850, where the outlet box body 810 is moveably mounted to a support surface 5 such that relative movement of the outlet box body 810 with respect to the mounting mechanism 500 in the elongated mounting slot 850 is permitted. Similarly, the mounting mechanism 500 may have a second tightened position in the elongated mounting slot 850 where the outlet box 810 is immovably mounted to the support surface 5 such that relative movement of the outlet box body 810 with respect to the mounting mechanism 500 in the elongated mounting slot 850 is restricted. Therefore, the elongated mounting slot 850 functions substantially similarly to the elongated mounting slot 150 of outlet box 10 with respect to the mounting mechanism 500. However, the external retaining tab 850 may optionally not have a retaining opening 132.

As illustrated in FIGS. 8a to 8d, the external retaining tab 830 may extend from a surface 113 external of the internal space 122 of the outlet box body 830 and near the base wall 815. As also indicated in FIGS. 8a to 8d, two or more external retaining tabs 830 may be located at different positions about the box body 800, and may preferably be located equidistantly about the peripheral side wall 816. The external retaining tab 830 preferably extends planarly to the base wall 815 of the outlet box body 810, and the elongated mounting slot 830 is preferably substantially normal thereto.

As with the outlet box 10, the alternate outlet box 800 may have apertures 160 extending through the peripheral side wall 816 to the internal space 122. The apertures 160 may be connectable to corresponding conduits 9 aligned therewith. Accordingly, the mounting mechanism 500 in the first semi-tightened position in the elongated mounting slot 850, where the outlet box body 810 is moveably mounted to the support surface 5, would permit relative movement of the outlet box body 810 with respect to the mounting mechanism 500 lengthwise along the elongated mounting slot 850 to facilitate alignment of one or more apertures 160 with the corresponding conduits 9 to permit connection therewith. In this regard, the functionality of the elongated mounting slot 850 is similar to the elongated mounting slot 150.

Preferably, at least two substantially identical external retaining tabs 830 may be situated at substantially opposite ends of the peripheral side wall 816, provided access to the elongated mounting slots 850 of the external retaining tabs 830 is unobstructed by the apertures 160.

As with the outlet box 10, the alternate outlet box 800 preferably further comprises two mounting feet 170 situated at opposite ends of the peripheral side wall 860 and intermediately between the substantially identical external retaining tabs 830. The mounting feet 170 may have openings 171 for receiving the attaching mechanism 500 similar to the outlet box 10. As with the outlet box 10, the mounting feet 170 in the alternate outlet box 800 may be used for narrow surfaces or elsewhere where the elongated mounting slots 830 are not practical or permitted.

As illustrated in FIGS. 8*a* to 8*d*, the apertures 160 may extend substantially perpendicular to the opposed opening 818 and perpendicular to the elongated mounting slots 830. Furthermore, for ease of manufacture, the bosses 820 having the threaded openings 821 or threaded metal insert (not shown) may be oriented on the internal portion of the apertures 160 extending through the peripheral side wall 816 into the internal space 122. In this way, as illustrated for example in FIG. 8*d*, the threaded openings 821 may be near the top or rim of the peripheral side wall 816 to provide easy access to releasably connect electrical components thereto.

It is understood that the threaded openings 821 may comprise an insert which may be a metal insert. Accordingly, in a preferred embodiment, the bosses 820 may potentially have a metal insert (not shown) which may be preferred for connection to luminaires, such as light fixtures, as the metal inserts provide a potentially stronger physical connection. Furthermore, threaded openings 821 having a metal insert may potentially assist with electrical grounding of the light fixtures. Furthermore, the outlet box body 810 may have a grounding opening 13 for optionally receiving a grounding screw (not shown) to further facilitate grounding of any electrical components. In this regard, the box body 110 may also comprise as grounding opening 13 for optionally receiving a grounding screw (not shown) as may be preferred in certain embodiments and/or required to meet regulatory approvals in certain jurisdictions.

It is understood that the alternate outlet box 800 could also be designed to be used with a lid (not shown) in addition to the threaded openings 821 on the bosses 820. In this case, a lid (not shown) could be designed to fit over the centralized opening 818 and cover the internal space 112. In this case, the external retaining tabs 830 may have a retaining opening 132 also.

To the extent that a patentee may act as its own lexicographer under applicable law, it is hereby further directed that all words appearing in the claims section, except for the above defined words, shall take on their ordinary, plain and accustomed meanings (as generally evidenced, inter alia, by dictionaries and/or technical lexicons), and shall not be considered to be specially defined in this specification. Notwithstanding this limitation on the inference of "special definitions," the specification may be used to evidence the appropriate, ordinary, plain and accustomed meanings (as generally evidenced, inter alia, by dictionaries and/or technical lexicons), in the situation where a word or term used in the claims has more than one pre-established meaning and the specification is helpful in choosing between the alternatives.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments, which are functional, electrical or mechanical equivalents of the specific embodiments and features that have been described and illustrated herein.

The embodiments of the invention in which an exclusive property or privilege is claimed are defined as follows:

1. An outlet box comprising:
   a box body having walls defining an internal space with a lid opening, said lid opening permitting access to the internal space;
   a tamper resistant tab associated with the lid opening, said tamper resistant tab having a tamper resistant opening sized for receiving an attaching mechanism;
   a lid having a peripheral projection with a peripheral opening, said lid releasably attachable to the lid opening in a closed configuration which prevents access to the internal space of the box body through the lid opening;
   first threads on the lid opening and mating second threads on the lid;
   an external retaining tab located externally from the internal space, said external retaining tab including a retaining opening, said peripheral opening and retaining opening sized to receive the attaching mechanism therethrough for releasably attaching the lid to the external retaining tab in an open configuration; and
   wherein relative alignment of the peripheral opening with the retaining opening permits the attaching mechanism to be received through the peripheral opening and the retaining opening to releasably attach the lid to the external retaining tab in the open configuration which permits access to the internal space through the lid opening;
   wherein relative manual rotation of the lid with respect to and adjacent the lid opening causes the first and second threads to rotationally engage and releasably attach the lid to the lid opening in the closed configuration preventing access to the internal space;
   wherein relative alignment of the peripheral opening of the peripheral projection with the tamper resistant opening of the tamper resistant tab when the lid is in the closed configuration permits the attaching mechanism to be received therethrough to releasably secure the lid to the outlet body in the closed configuration; and
   wherein the attaching mechanism comprises a tool engagement surface requiring a tool to remove the attaching mechanism from the tamper resistant opening to unsecure the lid from the lid opening in the closed configuration.

2. The outlet box as defined in claim 1 wherein the walls of the outlet box body comprise a base wall opposed from the lid opening and a peripheral side wall separating the base wall from the opposed lid opening to define the internal space therein.

3. The outlet box as defined in claim 2 wherein the external retaining tab extends from a surface external of the internal space of the outlet box body and near the base wall.

4. The outlet box as defined in claim 2 wherein the external retaining tab extends planarly with the base wall of the outlet box body, and the retaining opening is substantially normal thereto.

5. The outlet box as defined in claim 4 wherein the external retaining tab further comprises an elongated mounting slot extending lengthwise substantially parallel to the peripheral side wall for receiving a mounting mechanism at different positions along its length to mount the outlet box body; and
- wherein the mounting mechanism has a first semi-tightened position in the elongated mounting slot, where the outlet box body is movably mounted to a support surface such that relative movement of the outlet box body with respect to the mounting mechanism in the elongated mounting slot is permitted, and a second tightened position in the elongated mounting slot, where the outlet box body is immovably mounted to the support surface such that relative movement of the outlet box body with respect to the mounting mechanism in the elongated mounting slot is restricted.

6. The outlet box as defined in claim 5 wherein the retaining opening is adjacent the elongated mounting slot and separated therefrom by a first retaining distance greater than a second peripheral distance of the peripheral opening to an edge of the peripheral projection of the lid, such that the peripheral projection avoids obstructing the elongated mounting slot when the lid is releasably attached to the external retaining tab in the open configuration.

7. The outlet box as defined in claim 5 wherein the peripheral side wall comprises apertures extending to the internal space, said apertures connectable to corresponding conduits aligned therewith; and
- wherein the mounting mechanism in the first semi-tightened position permits relative movement of the outlet box body with respect to the mounting mechanism lengthwise along the elongated mounting slot while the outlet box body is movably mounted to the support surface to facilitate alignment of one or more apertures with the corresponding conduits to permit connection therewith.

8. The outlet box as defined in claim 7 further comprising at least two substantially identical external retaining tabs situated at substantially opposite ends of the peripheral side wall, and wherein access to the external retaining tabs is unobstructed by the apertures.

9. The outlet box as defined in claim 8 further comprising at least two mounting feet situated at opposite ends of the peripheral side wall and intermediately between the substantially identical external retaining tabs, said at least two mounting feet having mounting holes for receiving the mounting mechanism when the outlet box is fixed to the support surface and relative movement of the outlet box body with respect to the mounting mechanism in the mounting feet is restricted.

10. The outlet box as defined in claim 1 wherein, when the tamper resistant opening and the peripheral opening have received the attaching mechanism therethrough with the lid in the closed configuration, relative manual rotation of the lid with respect to the lid opening is prevented.

11. The outlet box as defined in claim 10 wherein after the tamper resistant opening and the peripheral opening have received the attaching mechanism therethrough with the lid in the closed configuration, relative manual rotation of the lid with respect to the lid opening to remove the lid is prevented until after the attaching mechanism has been removed from the tamper resistant opening.

12. The outlet box as defined in claim 1 wherein, the attaching mechanism optionally releasably attaches the lid to the outlet box body in the open configuration by being received through the relatively aligned peripheral opening and retaining opening; and
- wherein the attaching mechanism optionally prevents relative manual rotation of the lid with respect to the box body by being received through the relatively aligned peripheral opening and tamper resistant opening when the lid is in the closed configuration.

13. The outlet box as defined in 1 wherein the attaching mechanism comprises a longitudinal portion extending from the tool engagement surface, said longitudinal portion being sized and shaped to be received by the tamper resistant opening, the retaining opening and the peripheral opening, with the tool engagement surface extending from the peripheral opening such that the tool engagement surface is accessible when the longitudinal portion of the attaching mechanism has been received through the peripheral opening of the peripheral projection.

14. The outlet box as defined in claim 1 wherein the walls of the outlet box body comprise a base wall and a peripheral side wall affixed to and extending substantially perpendicularly from the base wall to define the internal space between the peripheral side wall and the base wall with the base wall facing the lid opening;
- wherein the external retaining tab extends from a surface external of the internal space of the outlet box body and near the base wall; and
- wherein the retaining opening is remote from the lid opening.

15. The outlet box as defined in claim 1 wherein the lid comprises a co-molded gasket to seal the internal space when the lid is releasably attached to the lid opening in the closed configuration.

16. The outlet box as defined in claim 1 wherein the attaching mechanism is removed from the tamper resistant opening to permit the lid to be unsecured from the lid opening while the attaching mechanism remains attached to the peripheral opening.

17. The outlet box as defined in claim 1 wherein the first threads are 2-start threads, and the second threads are mating 2-start threads.

* * * * *